No. 719,490. PATENTED FEB. 3, 1903.
S. MORGAN.
CANDY CRIMPING MACHINE.
APPLICATION FILED MAY 17, 1902.
NO MODEL.
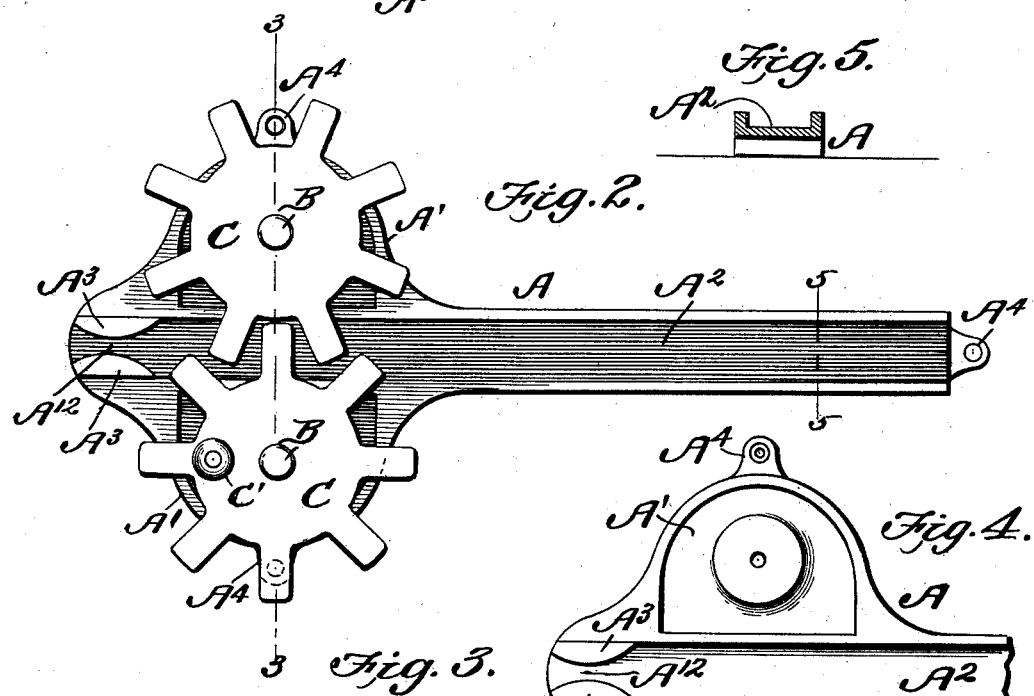

UNITED STATES PATENT OFFICE.

STEPHEN MORGAN, OF MYSTIC, CONNECTICUT.

CANDY-CRIMPING MACHINE.

SPECIFICATION forming part of Letters Patent No. 719,490, dated February 3, 1903.

Application filed May 17, 1902. Serial No. 107,834. (No model.)

*To all whom it may concern:*

Be it known that I, STEPHEN MORGAN, a citizen of the United States, residing at Mystic, in the county of New London and State of Connecticut, have invented a new and useful Candy-Crimping Machine, of which the following is a specification.

This invention relates to an improved candy-crimping machine, and has for its object to provide a cheap, simple, and effective device for folding strips of candy into a series of oppositely-disposed crimps or folds; and with this object in view my invention comprises a base upon which is mounted a pair of gear-wheels that are so arranged as to leave a small space between the teeth and through which a strip of candy is passed for the purpose of forming the said crimps or folds.

Another object of my invention is to provide the base with a suitable channel-way for positively guiding the candy through the machine, and thereby keeping it in a perfectly-straight bar.

My invention also comprises certain details of construction and novelties of combination and arrangement of parts, as will be fully set forth in the following specification and pointed out in the claims, reference being had to the drawings, in which—

Figure 1 is a perspective view of my improved candy-crimper. Fig. 2 is a plan view of the same. Fig. 3 is a detail section taken about on the line 3 3 of Fig. 2. Fig. 4 is a detail plan view of the forward end of the base, and Fig. 5 is a detail section taken about on the line 5 5 of Fig. 2.

In carrying out my invention I employ a metal base A, whose forward end terminates in lateral extensions A', and between these extensions and throughout the entire length of the base is formed a channel-way $A^2$, whose forward end is reduced to form a contracted entrance to the channel-way, as shown at $A^{12}$, the said contracted portion being formed by suitable lugs $A^3$, which project a considerable distance above the surface of the base and have their inner faces curved, as clearly shown in the drawings. The base is also provided with perforated ears or lugs $A^4$, by which the said base is securely fastened to a table or board by means of screws or nails.

The lateral extensions A' are provided with suitable apertures, in which are held stud-shafts B, that are securely held in place by nuts B', and upon these stud-shafts are mounted wooden toothed or gear wheels C, which are designed to mesh with each other and project directly over the channel-way $A^2$ of the base, as will be clearly seen in Fig. 2 of the drawings. One of the wheels C is provided with a handle-knob C', by which the wheels are operated.

In operation the candy is first pulled into strips and the end inserted through the guide-way $A^{12}$ and pushed into engagement with the teeth of the wheels, which are at that time revolved in the direction indicated by the arrows and which grip or take hold the strip of candy and pull it through the channel-way, and as it passes between the wheels it will be readily seen that the strip is crimped or folded into a series of oppositely-disposed loops, and after the candy or the strip leaves the wheels it will enter into and be guided through the channel-way in the base, and thereby held in a perfectly-straight stick or strip, and, if desired, the crimps or loops may be pushed closer together after they have passed through the wheels by simply pressing upon the outer or free end of the strip toward the said wheels.

It will thus be seen that I provide an exceedingly cheap, simple, and effective machine, and by making the toothed wheels or gears of wood the candy is kept hot, which insures a more perfect operation.

In practice I may also form the contacting faces of the teeth of the wheels with suitable ornamental faces, which will mold the candy into a series of ornamental crimps or folds, as will be clearly understood.

Having thus fully described my invention, what I claim as new, and desire to secure by Letters Patent of the United States, is—

1. In a candy-crimping machine, the combination of a base having a channel-way arranged therein throughout its entire length, of a pair of toothed wheels journaled upon the base and meshing with each other, the meshing portions of the teeth projecting over or in the path of said channel-way, substantially as shown and described.

2. The combination of a metal base having a channel-way arranged centrally therein, of a pair of toothed wheels journaled upon the opposite sides of the said channel-way, the intermeshing teeth of said wheels being arranged over and in a direct horizontal line of the channel-way, and a contracted entrance formed in the forward part of the channel-way, substantially as shown and described.

3. In a candy-crimping machine, the combination of a metal base having a channel-way arranged centrally therein throughout its entire length and whose forward end is contracted, lateral extensions formed upon the base upon either side of the channel-way, toothed wheels mounted upon the said extensions and being adapted to intermesh, a handle arranged upon one of the wheels and lugs arranged upon the said base, substantially as shown and described.

4. As a new article of manufacture, a machine of the kind described comprising a metal base having a channel-way arranged centrally therein and whose forward end is contracted, a pair of wooden toothed wheels journaled upon the base and having their intermeshing teeth arranged directly over the said channel-way, and a handle arranged upon one of the wheels, substantially as shown and described.

5. In a candy-crimping machine, the combination with a metal base having a narrow rearward extension, a channel formed across the base and along said extension, and crimping-wheels positioned in either side of the channel on the main body of the base.

STEPHEN MORGAN.

Witnesses:
FRANK W. BATTY,
JOHN W. MCDONALD.